UNITED STATES PATENT OFFICE.

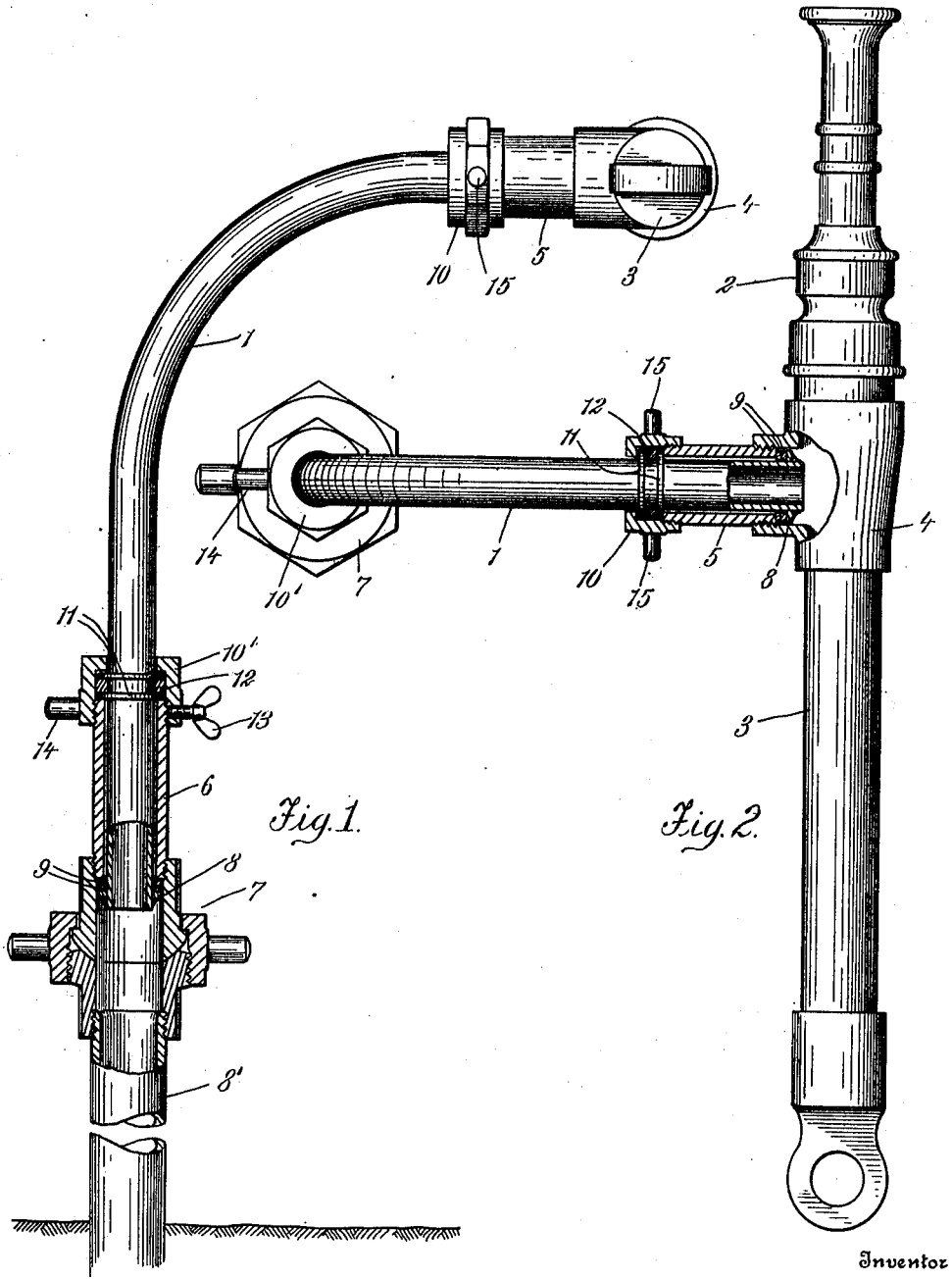

WILLIAM WITTEKOPF, OF SEATTLE, WASHINGTON.

WATER-SPRINKLER.

988,423.  Specification of Letters Patent.  Patented Apr. 4, 1911.

Application filed October 11, 1909. Serial No. 522,173.

*To all whom it may concern:*

Be it known that I, WILLIAM WITTEKOPF, a subject of the Emperor of Germany, and a resident of the city of Seattle, in the county of King and State of Washington, have invented certain new and useful Improvements in Water-Sprinklers, of which the following is a specification.

My invention has for its primary object to provide a device of the above type so constructed as to permit of the nozzle being readily adjusted in the desired direction without interfering with the free passage of the water.

A further object resides in the provision of a sprinkler, the nozzle of which is counterbalanced and supported to be set in rotation by the water issuing therefrom.

A further object is to provide a device of this character which is simple in construction, and comparatively inexpensive to manufacture.

With the above and other objects in view, to be referred to as my description progresses, my invention resides in the structural features, arrangements and combinations of parts hereinafter described and succinctly defined in my annexed claim.

Referring to the accompanying drawing, wherein like numerals of reference indicate like parts throughout: Figure 1 is a side elevation of a water sprinkler constructed in accordance with my invention, parts being broken away, and Fig. 2 is a top plan thereof, in partial section.

In carrying out my invention, I provide a swiveled pipe section 1, bent intermediate of its ends whereby one end portion is projected to one side of the other and at substantially right angles thereto. This pipe section forms a support for a nozzle 2, which latter is swiveled on one end portion thereof for rotation in a plane at right angles thereto, as will be more fully set forth hereinafter.

Reference numeral 3 indicates a counterbalance for nozzle 2, the same consisting of a suitably plugged length of pipe which extends rearwardly of and in alinement with the nozzle and serves also as a handle through the medium of which the operator can adjust the device to vary the direction of discharge of the water.

Reference numeral 4 indicates a tee-coupling connecting nozzle 2 with counterbalance 3 and with a nipple 5, the latter extending at right angles to said nozzle and rotatably receiving the horizontally disposed upper end portion of pipe section 1.

The vertically disposed lower end portion of pipe section 1 projects through and is swiveled in a nipple 6 secured to a union 7, having connection with a stand pipe 8' or other source of supply.

In order that pipe section 1 and the nozzle 2 may be held in a secure manner against displacement by action of the water both ends of the pipe section 1 are provided with external flanges 8, between which and the inner ends of the adjacent nipples, suitable wearing rings 9 can be inserted.

Reference numerals 10, 10' indicate cap nuts threaded on the outer end portions of nipples 5 and 6 respectively, the same receiving metal packing rings 11 between which flexible rings 12 of suitable material, are engaged and expanded by proper operation of the cap nuts, as will be readily understood. Cap nut 10' is preferably provided with a set screw 13, for holding the same as set, and directly opposite this set screw is a lug 14 which can be readily grasped with said set screw to effect turning of the cap nut. Opposite lugs 15 are provided on cap nut 10 for a similar purpose.

My invention is particularly adapted for a lawn sprinkler and by reason of the arrangement of the counterbalanced nozzle 2, when the same is directed horizontally or at a slight angle thereto, water issuing therefrom will impart rotary movement to pipe section 1. My invention obviously is not limited to such an application however.

Having thus fully described my invention, what I claim as new and desire to secure by Letters Patent of the United States, is:

A water sprinkler comprising a pipe having its end portions extending at an angle to one another and swiveled at one end, the other end portion of said pipe having an external flange, a nipple swiveled on the last named end portion of said pipe rearwardly of the said flange thereof so as to be held thereby against movement in one direction, a coupling secured to said nipple and extending outwardly at an angle thereto, and a nozzle secured to said coupling and projecting to the side of the last named end portion of said pipe, and a cap nut on the opposite end portion of said nipple, packing rings interposed between said cap nut and the adjacent end of said nipple.

Signed at Seattle, Washington this 1st day of October 1909.

WILLIAM WITTEKOPF.

Witnesses:
A. A. BOOTH,
STEPHEN A. BROOKS.

Copies of this patent may be obtained for five cents each, by addressing the "Commissioner of Patents, Washington, D. C."